United States Patent
Solomon

(10) Patent No.: US 8,384,785 B2
(45) Date of Patent: *Feb. 26, 2013

(54) SYSTEM AND METHODS FOR VIDEO IMAGING MODULATION

(76) Inventor: Neal Solomon, Oakland, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/932,866

(22) Filed: Mar. 8, 2011

(65) Prior Publication Data

US 2012/0229659 A1    Sep. 13, 2012

Related U.S. Application Data

(60) Provisional application No. 61/339,771, filed on Mar. 9, 2010.

(51) Int. Cl.
| H04N 5/225 | (2006.01) |
| H04N 5/228 | (2006.01) |
| H04N 5/217 | (2011.01) |
| H04N 5/335 | (2011.01) |
| H04N 3/14 | (2006.01) |
| H04N 9/04 | (2006.01) |
| H04N 5/222 | (2006.01) |

(52) U.S. Cl. .................. 348/207.1; 348/241; 348/222.1; 348/273; 348/342; 348/208.11; 348/333.08

(58) Field of Classification Search ............... 348/222.1, 348/241, 252, 234, 235, 231.99, 207.1, 207.11; 345/2.3, 102.7; 382/167, 274, 293, 162, 382/163

See application file for complete search history.

(56) References Cited

U.S. PATENT DOCUMENTS

| 2005/0261849 A1* | 11/2005 | Kochi et al. ................... 702/85 |
| 2007/0030357 A1* | 2/2007 | Levien et al. ............ 348/211.14 |
| 2007/0236574 A1* | 10/2007 | Alon et al. ............... 348/207.99 |
| 2008/0174678 A1* | 7/2008 | Solomon ................. 348/231.99 |

* cited by examiner

Primary Examiner — James Hannett
Assistant Examiner — Stephen Coleman

(57) ABSTRACT

A multi-functional digital imaging system is described that disaggregates camera functions into video imaging modulation processes, including DSP feedback, moving object modulation, frame rate modulation, video file analysis and video file organization.

20 Claims, 11 Drawing Sheets

SYSTEM AND METHODS FOR VIDEO IMAGING MODULATION

CROSS-REFERENCES TO RELATED APPLICATIONS

The present application claims the benefit of priority under 35 U.S.C. §119 from U.S. Provisional patent application Ser. No. 61/338,771, filed Mar. 9, 2010, the disclosure of which is hereby incorporated by reference in their entirety for all purposes.

FIELD OF THE INVENTION

The invention pertains to optical image capture, digital image sensors, digital image signal processing, digital image filtration, compression, manipulation and camera circuitry, digital video image signal processing, compression, filtration and manipulation, digital image file storage, and digital image and digital video image display circuitry and display management. The invention also involves network computing functions involving digital imaging and digital video files and database management involving digital imaging and digital video files.

BACKGROUND OF THE INVENTION

A digital camera consists of an optical component, a digital sensor component, image processing circuitry, camera system circuitry, and a file storage component. Each of these component types have undergone, and continue to undergo, evolution. A problem that emerges is the issue of obsolescence. As each component in a camera system is updated, the overall system becomes obsolete, much like a computer. This constant updating and obsolescence forces users to upgrade to newer camera technology every few years.

The history of digital imaging is a story of filtration solutions to optical and digital aberrations. To solve these image aberrations, engineers have used integrated circuits and software techniques to address specific problems. For example, aliasing and moiré effects have been solved by applying anti-aliasing and low-pass filters that contain complex software algorithms. Further, the problem of optical aberrations, such as vignetting, pin cushioning and chromatic aberrations, are filtered by applying digital solutions. The need to improve these solutions forces the camera circuitry to be upgraded periodically, which creates the problem of obsolescence.

As camera elements have gotten smaller and more efficient, cameras have become ubiquitous. It is common to find camera components embedded in wireless phones and devices (PDAs), tablets and mobile computers. Not only are these optical systems able to process still digital images, but they are also able to capture, process, filter and manage digital video images. The problem remains, however, whether in digital cameras, digital video cameras or wireless devices with camera components, that the quality of the image produced is often poor. The smaller and cheaper the digital camera, digital video camera or digital optical device, the more problematic the image quality becomes.

So far, the idea of the digital camera has been limited to a device which contains integrated optical components, a sensor component, digital image signal processing circuitry, digital image filtration circuitry and digital file storage circuitry. However, each of these integrated components may be improved upon in a modular way and disintegrated in successor upgraded imaging devices.

It is possible to use digital imaging technologies to improve digital image problems such as optical and digital aberrations. Solomon (U.S. Pat. No. 7,612,805) has developed a digital imaging system for filtration to improve optical and digital aberrations created by lens and sensor constraints. Specific digital imaging filtration techniques are available as algorithms applied to specific imaging problems.

In addition to providing filtration, digital imaging provides the opportunity to manipulate the image to user preferences. For example, it is possible to manipulate depth of field in digital images by controlling lens aperture.

The digitalization of images further allows digital files to be transmitted on computer networks for storage. Shutterfly has developed a business model based on the storage and management of digital images on computer network servers and databases for photo sharing.

The dominant model for advanced digital photography is the digital single lens reflex (D-SLR) camera. In the main, most D-SLR cameras are organized to work within one paradigm. Film-based SLR cameras operate by using a lens apparatus connected to a camera body. When a shutter button is depressed, a microprocessor in the camera activates a shutter in the camera and an aperture in the lens to capture light onto a plane of film after a mirror flips up exposing the film. The silver-halide-based film is then chemically developed and images are preserved.

In a D-SLR, when the shutter button is depressed, a microprocessor (or SoC) in the camera activates a shutter in the camera and an aperture in the lens to capture light onto a digital sensor after a mirror flips up exposing the digital sensor. The sensor is typically either a charge coupled device (CCD) or a complementary metal-oxide semiconductor (CMOS) circuit that converts light to electrons. Once the sensor is exposed to light from the lens, camera circuitry moves the data from the sensor to a digital signal processor (DSP). The DSP performs a set of functions that filter the digital image file and transfers the converted data file to camera circuitry that stores and displays the corrected image file. A microprocessor (or SoC), which accesses a database in the camera, controls the image exposure settings, the internal camera circuitry and the mechanical operations of the shutter. In some cases, the camera microprocessor circuitry provides feedback to a microprocessor in the lens in order to measure and control the lens aperture and to synchronize exposure information between the lens aperture and the camera shutter. The user is able to manipulate the lens aperture, the camera shutter speed, the camera ISO speed, the data compression rate, and, in some cases, artificial light (such as a flash). The camera circuitry converts an analog image to digital format and converts the digital file to an analog image for presentation.

When any of these digital camera components can be improved, it is unfortunately necessary to upgrade the entire camera system. This process of upgrading a camera is costly and inefficient for the user. What is needed is a modular system that is able to upgrade different camera components independently.

SUMMARY OF THE INVENTION

The present invention views a camera system as an aggregation of components and functions that may be disaggregated. By disaggregating camera functions, such as sensor, camera circuitry, filtration mechanisms and data storage, it is possible to build a modular and improved camera system. Such a camera system is able to be personalized for specific image functions. Viewed in this light, the modular idea of a camera that is a set of disaggregated components sees a camera as an imaging process.

The present modular multi-functional, camera system allows the separation of an optical mechanism from the main components of digital imaging circuitry. The digital capture mechanism can essentially be separate from the digital image filtration components. The digital imaging and filtration circuitry may be separated from the digital storage components. The idea of a camera is thus disintegrated into differentiated components that may be in different locations.

In addition to being physically separated, the disaggregated camera may be modular. Each of the camera components is upgradeable without affecting the other components. For example, a digital imaging sensor may be periodically upgraded while not affecting other imaging components. Not only does this concept of camera component modularity increase efficiency of processing digital images but it progressively improves image quality as the components are successively upgraded over time.

The present system therefore develops a modular camera system for image capture, filtration, optimization, display and management of digital still or video files. Each of these camera components may be performed on different platforms. For instance, the digital image capture occurs at one location while the digital filtration occurs at a second location, modeling, analysis and optimization of the digital image at a third location, the digital image management occurs at a fourth location and the image is finally displayed at a fifth location. At any stage in the process, the user may maintain control of the imaging process. In fact, since there is more computer processing and data storage capacity in computer networks than in a camera, the image work flow process is accelerated while the image quality improves appreciably.

Development of the present modular multi-functional digital imaging system results from understanding the limits of digital photography. While digital cameras have evolved in the last few years to include intra-camera computer circuitry for digital image processing, there are significant limits to all aspects of the in-camera components. First, the digital sensor has size and precision constraints. Second, the camera (and lens) electronic circuitry (MPs, ASICs and DSPs) have processing constraints. Third, as the camera sensor size increases, the digital image file size correspondingly increases, posing substantial storage limits on the internal camera processing and storage components. Because of the increase in data set and file size, the camera circuitry has limits of multi-tasking. With increased file size also comes a limit in in-camera feedback, which slows down the imaging process. While camera manufacturers can invest in faster chips, this increases the cost of the camera, which further exacerbates the obsolescence problem. Though digital photography has a number of advantages over film photography, there are constraints inherent in the evolution of digital imaging technologies.

The challenges presented here, then, include (a) how to disaggregate digital camera functions, (b) how to integrate external computer functions into a digital camera, (c) how to efficiently compress and decompress digital and video images in a lossless and scalable way (d) how to modify DOF by adjusting aperture, shutter, ISO (and flash) using feedback mechanisms of a digital camera, (e) how to evolve and apply algorithms for digital camera applications, (f) how to optimize digital images with remote network computer database management systems, (g) how to optimize digital video imaging with an external network computer system, (h) how to analyze digital images in real-time, (i) how to optimize a digital video image, (j) how to organize an image for different displays, (k) how to organize a DSP in a remote computer(s) or in a display, (l) how to use computer networks for processing, storage and display of digital images (m) how to manage digital image storage and retrieval and (n) how to prevent continued camera obsolescence.

Digital imaging has become ubiquitous in recent years. Consequently, the present invention applies to a range of imaging technologies. The imaging devices and systems to which the present invention applies include all digital cameras and digital video cameras. These camera devices include cell phones, PDAs, telephones, video camcorders, digital video cameras, digital SLRs, laptops, netbooks, tablet computers and video teleconferencing systems. The system also applies to medical diagnostics, sensor networks, satellite imaging systems, printers and copiers.

The present system solves a range of imaging multi-objective optimization problems (MOOPs). For example, the system modulates shutter speed, aperture and ISO (and flash) to optimize DOF. Also, the system modulates exposure, zoom and video. DSPs and image processing circuitry are optimized to solve each type of MOOP.

The present invention provides a set of advances to the field of digital imaging.

Novelties of the Invention

While still image capture, filtration, compression and management involve a set of spatial-dependent methods that are distinct to the still image photographic genre, the video imaging photographic genre involves temporal-dependent methods as well. Video imaging dynamics involve a range of methods, including modulation for zoom lenses, DSP feedback, moving object modulation, frame rate modulation, video file analysis and combination and video file organization in distributed computers. The system uses methods involving these video imaging aspects.

The present system develops a disaggregated digital imaging system which consists of a set of modular components. Viewed in this light, cameras consist of less internal image processing components, which control their costs and persistent obsolescence. Instead, the digital image processing components are external to the camera, downloaded to the camera or contained in external devices such as laptop or network computers. For example, the digital image filtration, analysis, modeling and optimization functions are better performed off-site.

The present invention reconceptualizes DSPs, which are a main processing engine of modern digital cameras. DSPs are able to process multiple pathways, to download customized algorithms and to modulate their resources based on user demands. In effect, the DSP is changed from a fixed camera circuit function to a process used to optimize individual user workflow.

External computer networks become integrated into the extended modular camera system by utilizing broadband bandwidth. As broadband bandwidth becomes a commodity, access to computer networks becomes a utility. The present invention conceives of digital image processing as a service in which images are analyzed, filtered, optimized and stored in computer networks, but controlled by user customization.

Advantages of the Invention

The present system allows the camera to be disaggregated into specific upgradeable components that allow the management of image work flow in order to optimize image quality for each user. There are layers of features available to users on demand that turns imaging into a process. Image processing speed is improved along with the dramatic increase in the size and quality of image files.

The combination of these elements suggests that each camera is personalized for each user at the most efficient cost. As each photographer uses more features, the camera as service process increases the fees correspondingly. Each user may optimize the digital imaging process by using extensive computer network functionality of image file analysis, modeling, filtration, optimization, storage and display.

Overall, camera prices decline markedly while image quality dramatically increases in the present system. Smaller imaging components in inexpensive devices (PDAs, smart phones, tablets, laptop computers and so on) become feature rich elements that optimize digital imaging and digital video.

LIST OF ABBREVIATIONS

ASIC, application specific integrated circuit
CCD, charge coupled device
CMOS, complementary metal oxide semiconductor
CPU, central processing unit
CRT, cathode ray tube
DCT, discrete cosign transform
DOF, depth of field
D-SLR, digital single lens reflex (camera)
DSP, digital signal processor
DVI, digital video imaging
EPCA, exposure priority camera activation
FPGA, field programmable gate array
FFT, fast Fourier transform
LCD, liquid crystal display
LED, light emitting diode
MOOP, multi-objective optimization problem
MP, microprocessor
OLED, organic light emitting diode
OPCA, object priority camera activation
PDA, personal digital assistant
RGB, red green blue
SDI, still digital image
SoC, system on chip

DESCRIPTION OF THE MAIN EMBODIMENTS OF THE INVENTION (1) Method for Optimizing Digital Video Imaging Process with Zoom Lens Modulation An object is tracked in a video sequence in real time. Zoom lenses are useful to adjust focal length to track objects. The combination of using a zoom lens on a video camera allows the continuous modulation of objects in a temporal sequence.

The present method allows an object to be tracked as the zoom lens automatically adjusts and optimizes its focal length. The user registers a set of limits on the upper bound and lower bound of the zoom lens. The user then tracks a moving object in the video camera. As the object moves on an axis towards or away from the camera, the user changes the focal lengths of zoom lens within the preset user limits of the zoom lens. The user may override the zoom limits. The image size is stable in the video frames.

The zoom lens autofocus mechanism focuses on the object and identifies the continuously changing distance information. The distance information is sent to the camera microprocessor or SoC, which calculates the optimal focal length to correspond to the changing object position in order to obtain optimal framing and DOF. The camera microprocessor or SoC automatically adjusts the exposure information and sends the aperture data to the lens microprocessor to adjust the aperture setting.

As the moving object is tracked by the video camera, the user modulates the zoom lens focal length as it tracks the object. In effect, the object is continually tracked and framed by the zoom lens as the video camera records the sequence of object movement at multiple continuous focal lengths and field of view perspectives.

(2) Method for Optimizing Digital Video Imaging Process with Active DSP Feedback Process A still image digital camera has a DSP to perform specific pre-programmed filtration of the original sensor data. A video digital camera, on the other hand, has a set of image inputs. The set of images are processed sequentially by the DSP. Further, since some video cameras have three sensors, the DSP must process multiple images rapidly from several sources.

The present method involves an active DSP that has feedback with the image inputs. Once the image sensors send data files to the DSP, the DSP processes the image files sequentially. The active DSP sends a signal to the camera microprocessor or SoC to assess image file data, such as exposure data and camera settings. When the images being processed by the DSP are not within a user preferred range, the DSP sends a signal to the microprocessor or SoC to analyze the changing exposure data. The camera microprocessor or SoC adjusts the camera exposure settings by adjusting aperture, shutter speed and ISO and processes the scene with new exposure data. The new frames are then sent sequentially to the DSP for processing. This process of image exposure adjustment is continuous. The continual processing of images by the active DSP allows the camera exposure and filtration systems to be dynamic and to change as the scene changes.

In an embodiment of the present invention, multiple DSPs are used to filter different aspects of the images. The images are routed to the different DSPs based on network timing and specialized DSP function. Since some digital video cameras have multiple sensors, this model of using multiple DSPs is useful to filter and combine image files in the camera. In one implementation, the DSPs are each specialized.

(3) Method for Digital Video Image Organization with Frame Rate Modulation for Moving Object Though moving objects are tracked by video cameras, the trajectory, vector and rate of change of the objects are difficult to assess from a single vantage. In order to obtain an objective recording of a video, the objects require a modulation of their speed depending on the trajectory in relation to the camera vantage.

The present system uses the camera microprocessor or SoC to assess the speed and trajectory of an object relative to the camera. The camera SoC analyzes distance information obtained by focus tracking to assess object motion information. The camera microprocessor or SoC accesses a database to determine the optimum video frame rate to correspond to the object's speed and trajectory. The camera microprocessor or SoC calculates the object trajectory and speed information by assessing its movement relative to a matrix along the axis of the field from the camera to infinity. The camera microprocessor or SoC calculates the object's movement along a trajectory across the horizontal plane in combination with the object's velocity data to compute the optimal rate at which to adjust the camera frame rate to correspond with the object's motion. The object is then tracked in real-time by the video camera microprocessor or SoC, which modulates the frame rate to correspond to the object speed and trajectory.

The frame rate data are kept with the video file in order to provide data to the playback mechanism; the relatively faster or slower recorded frame rate requires a corresponding faster or slower replay. A key in the video file metadata provides frame rate data to allow replay modulation.

The net effect of this process of video frame rate modulation is to provide a more smooth appearance of motion continuity between moving objects.

(4) Methods for Video Modulation for Video Effect

Video frame rate modulation is used in the present system for special effects. While the frame rate is originally recorded at a normal (30 fps) rate, the video file is replayed at a faster or slower rate to obtain an altered video impression of motion. In the present method, the effects preference is specified by the user and the video camera records the images at a specific rate (relatively faster or slower) to bring the effect.

Another method used by the present invention is to modulate the shutter speed of the video camera to achieve a specific effect. When the shutter speed is slowed to a range of ½ of a second to $1/30^{th}$ of a second, and the video camera frame rate is normal, the effect in the video image is to provide a "flutter" effect. When the shutter speed of the video camera is modulated from normal speeds above $1/30^{th}$ of a second to ½ of a second, the effects modulate the image impression to create the flutter effect.

A third method used to modulate video effects is to apply a soft effects filter only to specific moving objects. The camera identifies specific objects with focus tracking. The camera microprocessor or SoC then identifies the motion of the objects. When the objects are moving, the camera microprocessor or SoC sends a signal to the camera DSP to apply a specific filtration only to the moving objects.

(5) Method for Digital Video File Track Marking

Digital video files consist of a set of digital still images organized into a combination of discrete scenes. Each of the scenes is an individual track, much like an audio track on a compact disk. The tracks of the digital video are stored in a video database. Each track represents a separate discrete scene that is organized according to specific categories. The category of each track is recorded in the video file's metadata.

The present invention allows multiple video files to be organized in the video database by storing the video tracks in specific categories. Specific video tracks are searched and retrieved from the video database by using hierarchical organization schemata consisting of categories and subcategories. These categories include scene type, time of file origination and file size. Most continuous video files are disaggregated into multiple tracks that are independently searchable.

The system uses tags at specific points at the beginning and end of discrete scenes to delineate the scene parameters. Given the use of tags, a video file effectively lays video tracks of specific scenes as the video progresses.

By using the video file storage system, it is possible in the present system to rapidly move from one video file or video track to another.

In an embodiment of the system, memory circuits are used to store video files and video tracks in different compartments for retrieval. In this scheme, for example, the most recent video files and tracks are searched first and the older files searched last.

(6) Method for Combining Digital Video Files in Camera

When the video file tracks are differentiated to accommodate different video scenes, the separate tracks require editing and combining in order to assemble into a coherent video file. The combination of the video file tracks is performed in the video camera in the present invention.

The individual video file tracks are tagged as they are videographed, with the meta-data recorded on each track. The tags are organized and copied in a separate meta-file to allow the organization and management of the video file tracks. The tags are ordered by the videographer in the camera. The tags reorder the video file track order to correspond to the video file tracking meta-data reorganization. The videographer has the ability to order, reorder and continually reorganize the file tracks by reorganizing the meta-data file data. The videographer is able to edit the video file in the camera after the capture video production phase is complete.

In one embodiment of the present invention, specific file tracks are filtered after the original capture production process by using post-production DSP filtration. The post-production filtered video tracks are then incorporated in the video editing process. In this case, there may be a delay in the sequence of the process of the video work flow to account for the video filtration process posterior to video capture but prior to the post-production filtration. The degree of delay depends on the difficulty of the filtration function. A one minute delay from capture to editing suggests a minimal filtration process, while a thirty minute or greater delay suggests a custom filtration process that occurs prior to the final in-camera editing process. Finally, this editing process may occur simultaneously with the continued video capture of new footage, suggesting the multi-tasking aspect of the work flow process.

(7) Method for Managing Digital Video Image File Feed in Real Time in Remote Computer The disaggregation model of camera functions applies to digital video cameras. The present method shows how the digital video camera consists essentially of a lens component, a sensor system and a storage system. The camera captures video images and stores the original unfiltered images in the camera.

The unfiltered original video image files are then sent to an external computer. In one implementation, this process occurs in real time in which the video feed is sent to a remote network computer. When the video feed is processed in real-time, there is a buffer for remote computer processing time.

The remote computer(s) then filters the video images. The advantage of this process is that remote computers have substantial DSP filtration library resources. With substantial DSP filtration capabilities come rapid speed of complex filtration processing as well.

Once the video files are filtered, they may be sent back to the camera and to other remote locations for display.

There is a significant advantage of incorporating substantial external resources into the video work flow process. Individual photographers may adjust the filtering of the remote DSPs to their preferences. For instance, the adjustment of highlight and shadow is performed by remote DSPs on the fly.

(8) Method for Combining Digital Video Files in Multiple Distributed Computers

The disaggregation of digital video camera functions in the present system allows the use of video processing components in different locations. When the video system is integrated in a computer network, using multiple databases and specialized filtration processing components, images are captured by different devices in different locations and streamed to computers in remote locations. The present system articulates a systems process for point-to-point video imaging in which video files are captured, filtered and managed in different locations.

(9) Method for Synchronizing Digital Video Files with Multimedia Features

The present invention allows users to add audio to a video track. The user may select public domain music, use their recorded music or pay a fee for copyrighted music. The audio file length is identified to correspond to the video file length. The system then synchronizes the music file with the video file. The audio file is imported into the camera to create a multimedia file.

Reference to the remaining portions of the specification, including the drawings and claims, will realize other features and advantages of the present invention. Further features and advantages of the present invention, as well as the structure and operation of various embodiments of the present invention, are described in detail below with respect to accompanying drawings.

It is understood that the examples and embodiments described herein are for illustrative purposes only and that various modifications or changes in light thereof will be suggested to persons skilled in the art and are to be included within the spirit and purview of this application and scope of the appended claims. All publications, patents, and patent applications cited herein are hereby incorporated by reference for all purposes in their entirety.

DETAILED DESCRIPTION OF THE DRAWINGS

Figure 1:
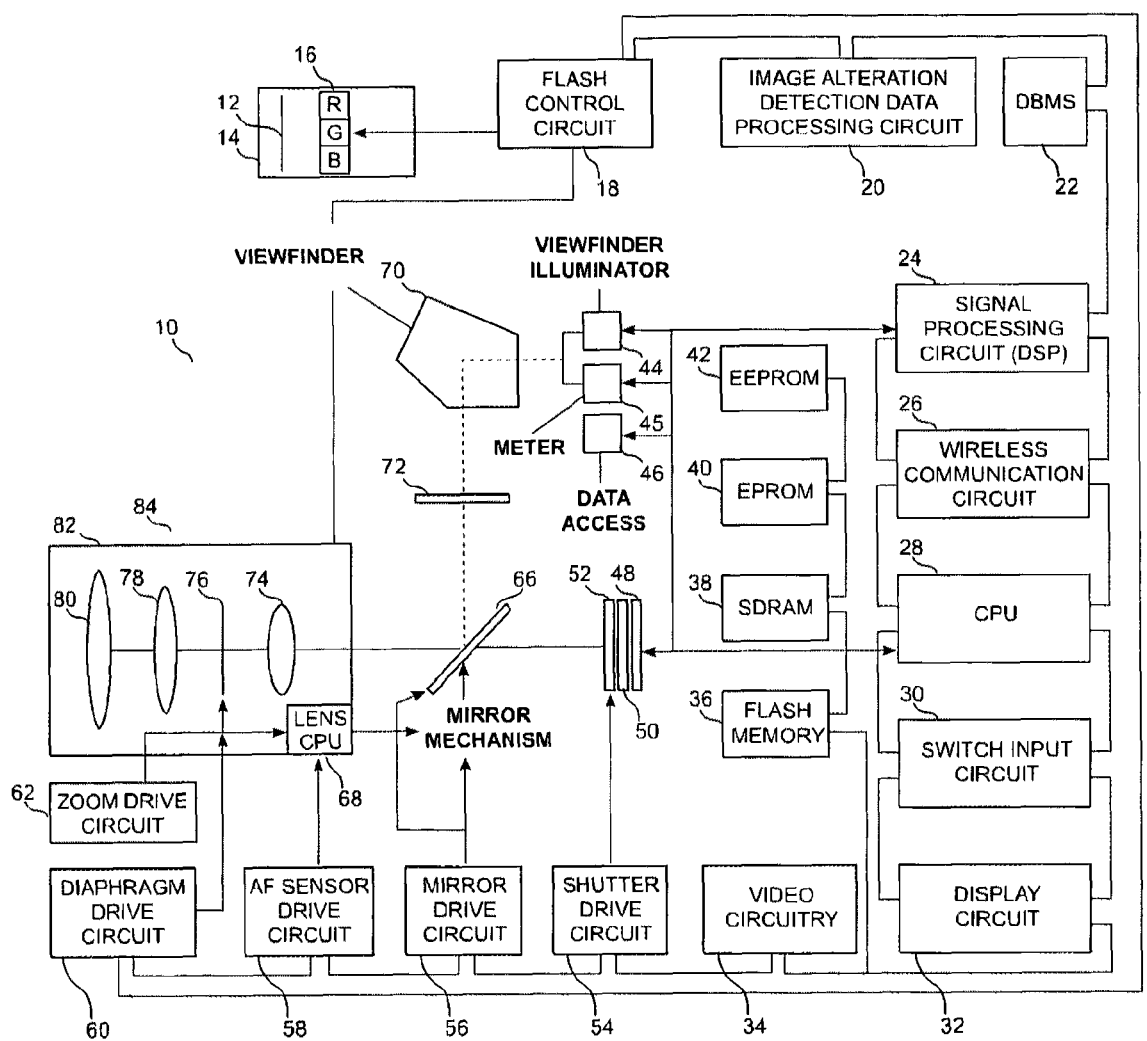
FIG. 1 is a schematic diagram of digital camera circuitry.

FIG. 1 shows the digital camera circuitry. The camera (10) consists of a housing with electronic circuitry to capture, process and store digital image files and a lens (84). The lens consists of a lens barrel (82), a set of lens groupings, including a front lens element (80), a middle lens element (78) and a rear lens element (74). The lens also includes a aperture diaphragm (76) and a lens CPU (68). In some cases, the lens includes at least one motor for autofocus. The lens may be a zoom lens or a fixed focal length lens. If the lens is a zoom lens, which provides a range of optical focal lengths, the lens includes a zoom drive circuit (62). The lens circuitry works in conjunction with the camera circuitry to maintain the aperture with a diaphragm drive circuit (60) and an autofocus sensor drive circuit (58).

In some, but not all cases, the camera contains a flash mechanism to provide artificial illumination. In FIG. 1, the flash mechanism is shown (14) with an illuminator (12) and a light apparatus (16) consisting of red, green and blue light functions. The flash mechanism is connected to a flash control circuit (18). In some cases, the flash mechanism is a separate apparatus that is attached to the camera device and is not internal to the camera.

The camera maintains a mirror in its single lens reflex (SLR) mode. In this case, the mirror mechanism (66) is operated by the mirror drive circuit (56). The mirror is in the down position in order to reflect light to a viewfinder (70) through a diaphragm (72) to allow the image from the lens to be viewed in the viewfinder. Not all embodiments of the invention, however, require a mirror mechanism. The viewfinder is illuminated (44) by a light in order to read information. Electronic data (46) is supplied to the user in the viewfinder, including the metering information provided by the camera metering system (45). The lens has a CPU (68) which may be a microprocessor or an SoC.

The camera uses a shutter apparatus (52), which is driven by a shutter drive circuit (54). When the mirror and the shutter are activated, light passes from the lens to the Bayer filter or anti-aliasing filter (50) and to the digital sensor (48). The digital image file is created by the digital sensor by converting photons to electrons. The image file is sent to either the signal processing circuit (DSP) (24) or the CPU (28). The image file is then sent to storage, typically a flash memory apparatus (36). In some cases, the image file is sent to an ASIC or cache for temporary storage before the DSP or CPU will process the file. In addition, the CPU may contain circuitry including an analog to digital converter, a digital to analog converter and a programmable gain amplification circuit. The CPU may be a microprocessor or a SoC.

In order to process the file, the CPU and DSP store data and instructions in EEPROM (42), EPROM (40), SDRAM (38) and DBMS (22) components, retrieve the data and instructions, process the file and send the processed file to storage. The system uses video circuitry (34) to organize the sequence of multiple video files and to coordinate the shutter, sensor and DSP for multiple image files. The aggregated camera circuitry may be contained in a single system on a chip (SoC)

device, which integrates a set of microcircuits and memory devices with specific functionality.

The camera also uses a switch input circuit (30) to control the camera functions and an image alteration detection data processing circuit (20) to process the image. The image is viewed in a display, typically an LED or LCD on the back of the camera, which is controlled by a display circuit (32). The display circuit may contain its own DSP to process and filter image files. The camera also uses a wireless communication circuit (26) to communicate wirelessly with outside devices. The wireless circuit may be Wi-Fi (802.11b/g/n), Bluetooth, 3G or 4G LTE. For example, the camera may upload image files to other devices or may download, image files, software or algorithms from other devices. In another implementation, the camera may use USB 1.0, 2.0 or 3.0, Firewire or Thunderbolt communications connections.

Figure 2:
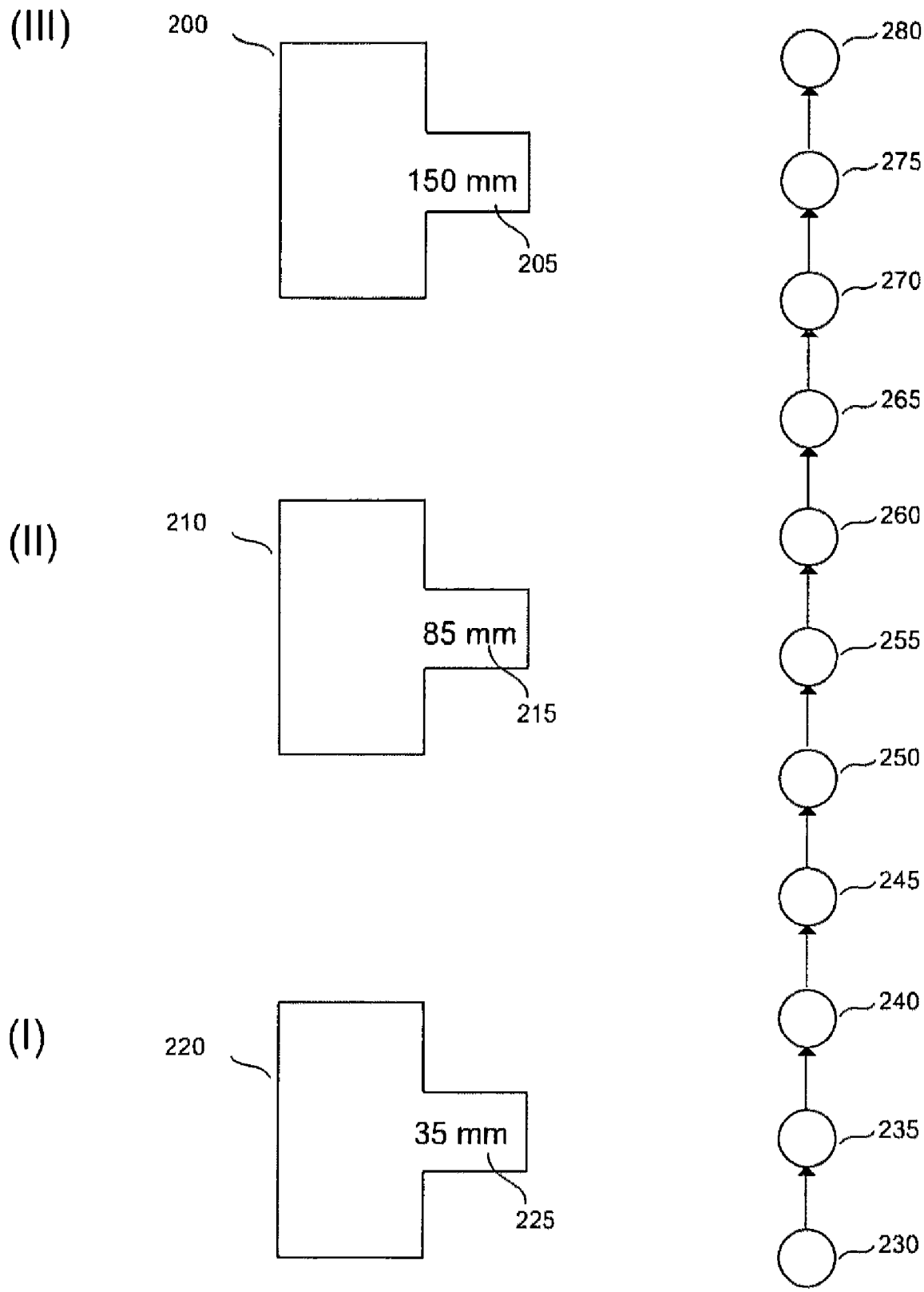
FIG. 2 is a schematic diagram of a video camera with a zoom lens configured at three different focal lengths to capture multiple frames of a moving object.

FIG. 2 shows a video camera with a zoom lens configured at three different focal lengths to capture multiple frames of a moving object. In the first phase, the camera (220) zoom lens is configured to a focal length at 35 mm (225). In the second phase, the camera (210) zoom lens is configured to a focal length at 85 mm (215). In the third phase, the camera (200) zoom lens is configured to a focal length at 150 mm (205). The object moves in a sequence from position at 230 to position at 280.

Figure 3:
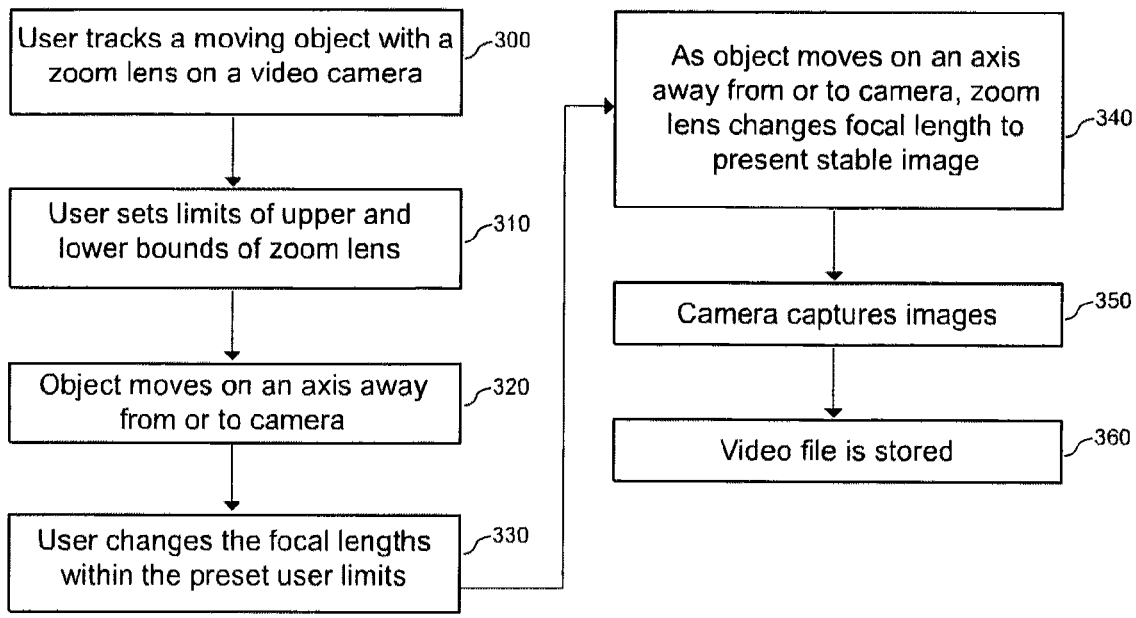
FIG. 3 is a flow chart showing the process of using a zoom lens to capture a video image file.

FIG. 3 shows the process of using a zoom lens to capture a video image file. After the user tracks a moving object with a zoom lens on a video camera (300), the user sets limits of upper and lower bounds of the zoom lens (310). The object moves on an axis away from or to the camera (320) and the user changes the focal lengths within the preset user limits (330). As the object moves on an axis away from or to the camera, the zoom lens changes the focal length to present a stable image (340). The camera captures images (350) and the video file is stored (360).

Figure 4:
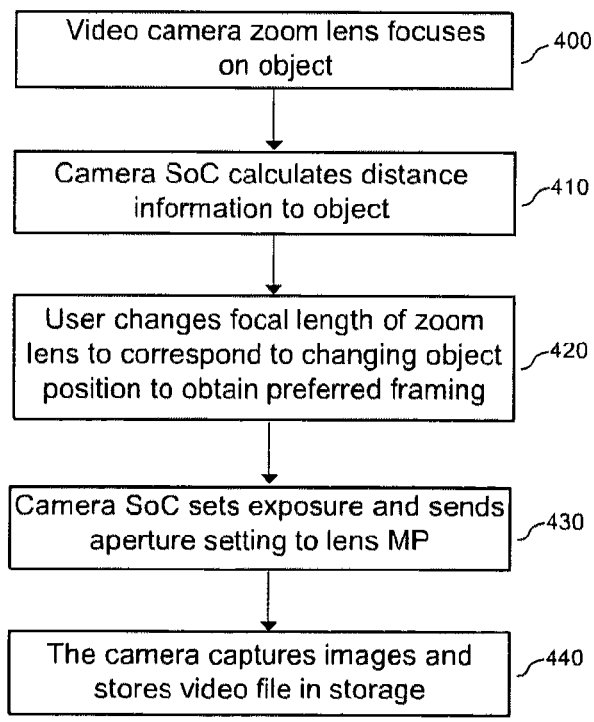
FIG. 4 is a flow chart showing the process of using a video camera with a zoom lens to change image perspective in a video image file.

FIG. 4 shows the process of using a video camera with a zoom lens to change image perspective in a video image file. After the video camera zoom lens focuses on an object (400), the camera SoC calculates distance information to the object (410). The user changes the focal length of the zoom lens to correspond to the changing object position to obtain preferred framing (420). The camera SoC sets the exposure and sends the aperture setting to the lens MP (430). The camera then captures images and stores the video file in storage (440).

Figure 5:
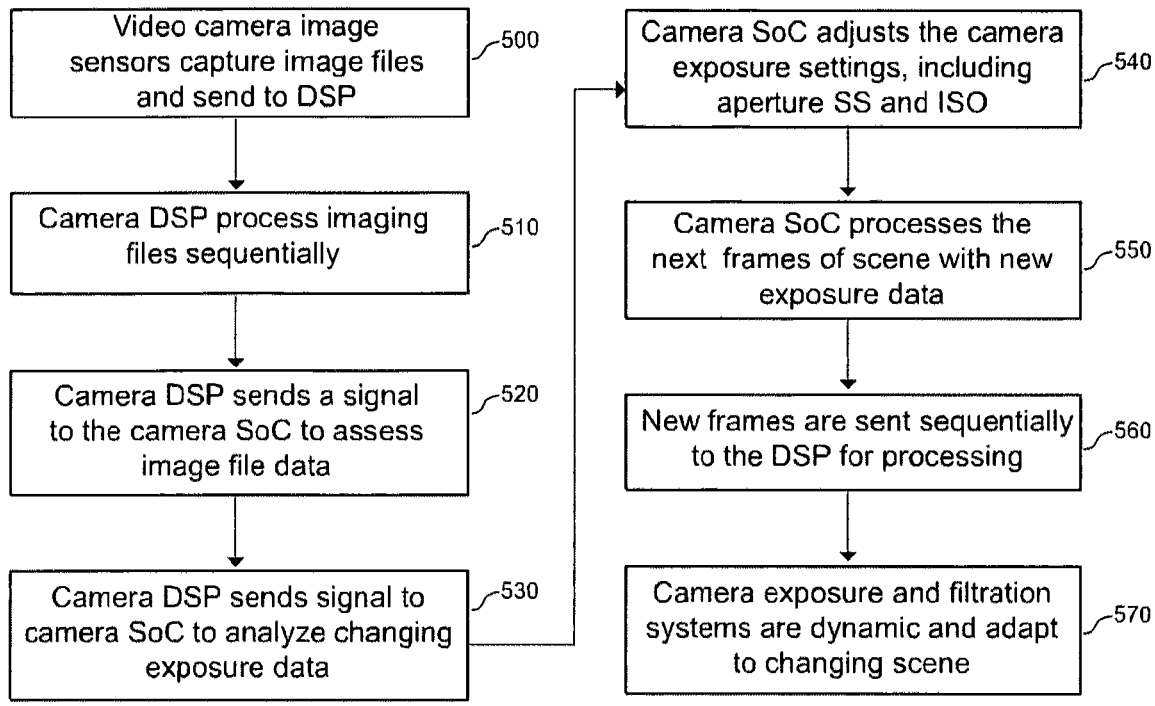
FIG. 5 is a flow chart showing the process of using a video camera SoC and DSP to optimize video image exposure.

FIG. 5 shows the process of using a video camera SoC and DSP to optimize the video image exposure. First, the video camera image sensors capture image files and send to the DSP (500). The camera DSP processes the image files sequentially (510) and sends a signal to the camera SoC to assess the image file data (520). The camera DSP sends a signal to the camera SoC to analyze the changing exposure data (530) and the camera SoC adjusts the camera exposure settings, including aperture, SS and ISO (540). The camera SoC processes the next frames of the scene with new exposure data (550) and the new frames are sent sequentially to the DSP for processing (560). The camera exposure and filtration systems are dynamic and adapt to a changing scene (570).

Figure 6:
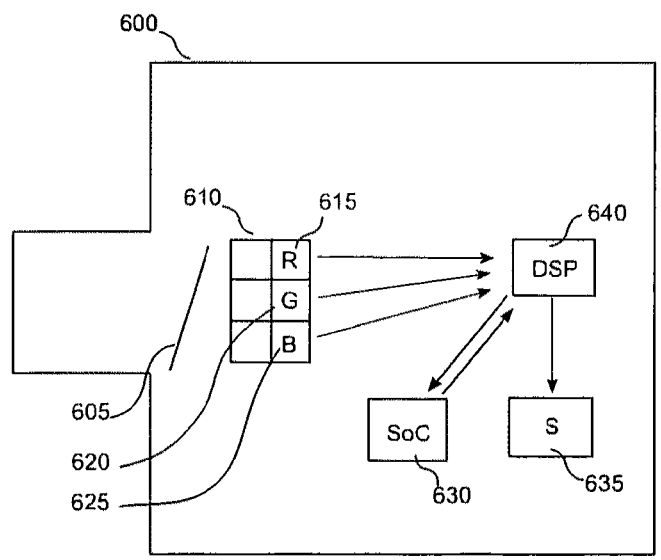
FIG. 6 is a schematic diagram of three sensors in a video camera that send an image file to a DSP, which accesses an SoC and filters and stores the image file.

FIG. 6 shows the three sensors in a video camera that dens an image file to a DSP, which accesses an SoC and filters and stores the image file. The camera (600) is shown with mirror (605) and sensor (610) apparatuses. The sensor array consists of three sensors (615, 620 and 625) organized as R-G-B. The three sensors forward image files to the DSP (640). The DSP interacts with the SoC (630) to obtain analytical data on the files (by comparing to a database) and specific filtration and compression algorithms. Once the DSP processes the image files, the files are sent to storage (635).

Figure 7:
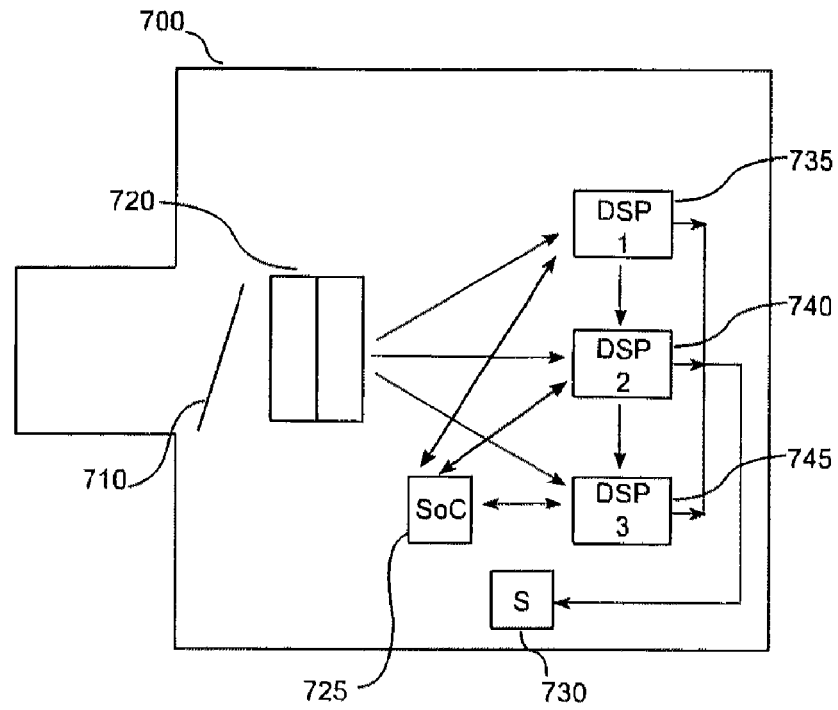
FIG. 7 is a schematic diagram showing the process of using a sensor, three DSPs and a SoC to capture and store image files in a video camera.

FIG. 7 shows the process of using a sensor, three DSPs and a SoC to capture and store image files in a video camera. The camera (700) is shown with mirror (710) and sensor (720) apparatuses. The sensor may consist of a sensor array. The sensor sends the image files to three DSPs (735, 740 and 745) in a sequence. The DSPs interact with the SoC (725), process the image files and send the files to storage (730).

Figure 8:
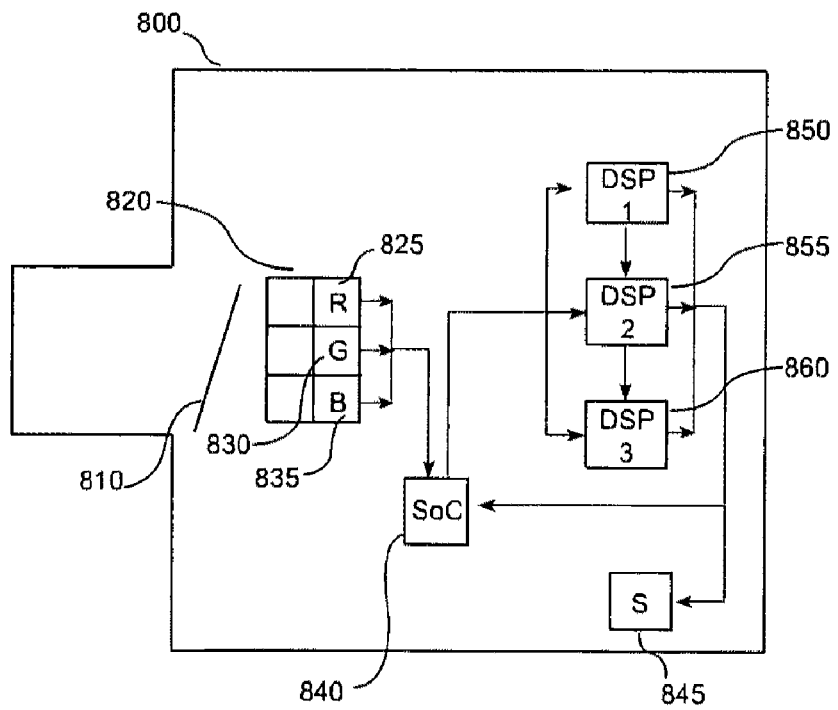
FIG. 8 is a schematic diagram showing the process of using three sensors in a video camera to capture image files and send the files to three DSPs and a SoC to filter and store the image files.

FIG. 8 shows the process of using three sensors in a video camera to capture image files and send the files to three DSPs and a SoC to filter and store the image files. The camera (800) is shown with mirror (810) and sensor (820) apparatuses. The sensor array consists of three sensors for R-G-B (825, 830 and 835). The sensor array sends image files directly to the SoC (840). The SoC then sends the image files in a sequence to the three DSPs, 1 (850), 2 (855) and 3 (860) which process the image files and send the processed image files to storage (845).

Figure 9:
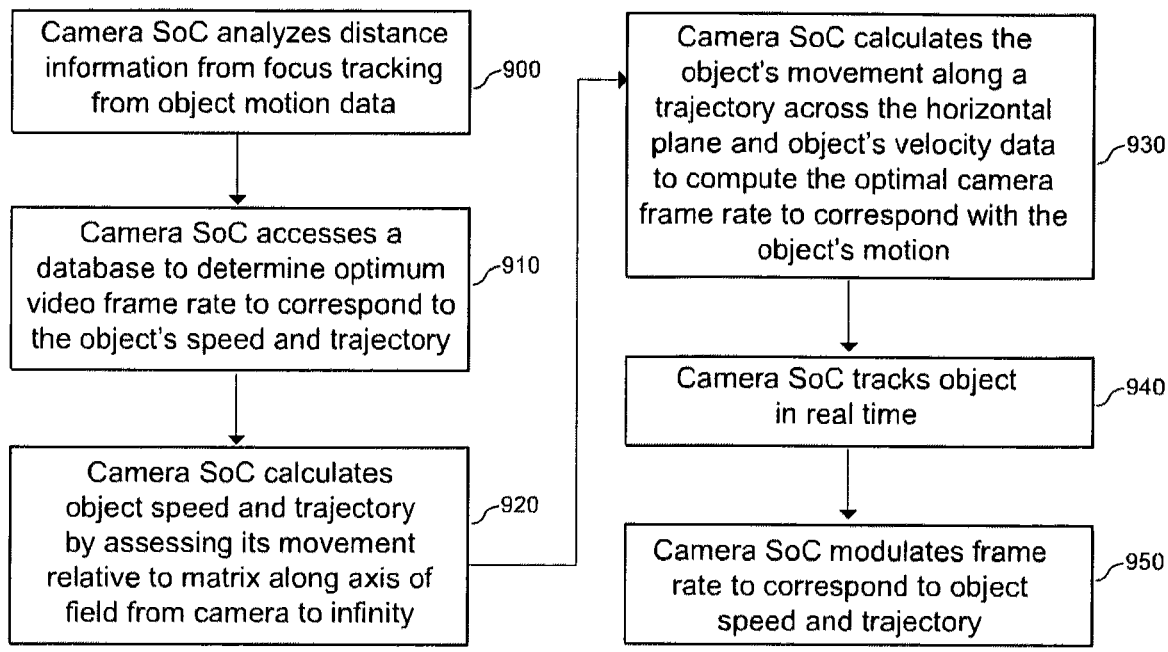
FIG. 9 is a flow chart showing the process of using a camera SoC to calculate the frame rate modulation in a video camera of a moving object.

FIG. 9 shows the process of using a camera SoC to calculate the frame rate modulation in a video camera of a moving object. After the camera SoC analyzes distance information form focus tracking from object motion data (900), the camera SoC accesses a database to determine an optimum video frame rate to correspond to the object's speed and trajectory (910). The camera SoC calculates the object speed and trajectory by assessing its movement relative to a matrix along the axis of the field from the camera to infinity (920). The camera SoC then calculates the object's movement along a trajectory across the horizontal plane and the object's velocity data to compute the optimal camera frame rate to correspond with the object's motion (930). The camera SoC tracks the object in real time (940) and modulates the frame rate to correspond to the object speed and trajectory (950). The camera SoC computes the variable frame rate and develops a key of the precise frame rate that corresponds to the object motion and applies the key for use in playback of the video file to modulate the video frame rate.

Figure 10:
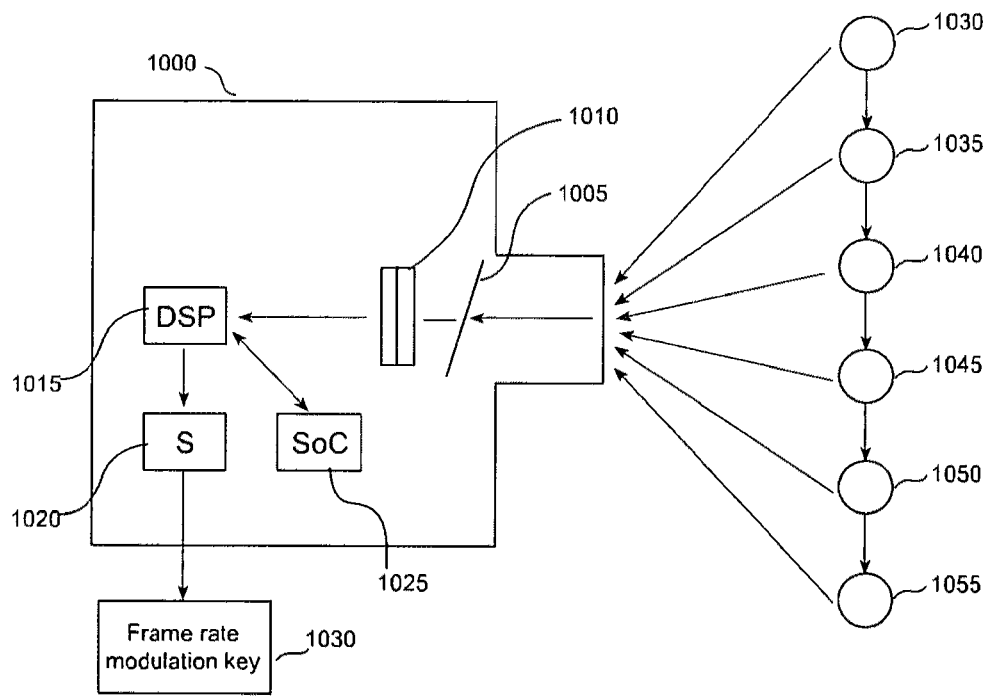
FIG. 10 is a schematic drawing showing the frame rate modulation process of a video camera in capturing a moving object by using a key for playback.

FIG. 10 shows the frame rate modulation process of a video camera in capturing a moving object by using a key for playback. The camera (1000) is shown with mirror (1005) and sensor (1010) apparatuses. The sensor captures the moving object, shown here moving from position 1030 to 1055. The video image file is sent to the DSP (1015), which interacts with the SoC (1025) and calculates the frame rate modulation and develops a key of the frame rate modulation. The DSP sends the video image file to storage (1020) with the frame rate modulation key (1030).

Figure 11:
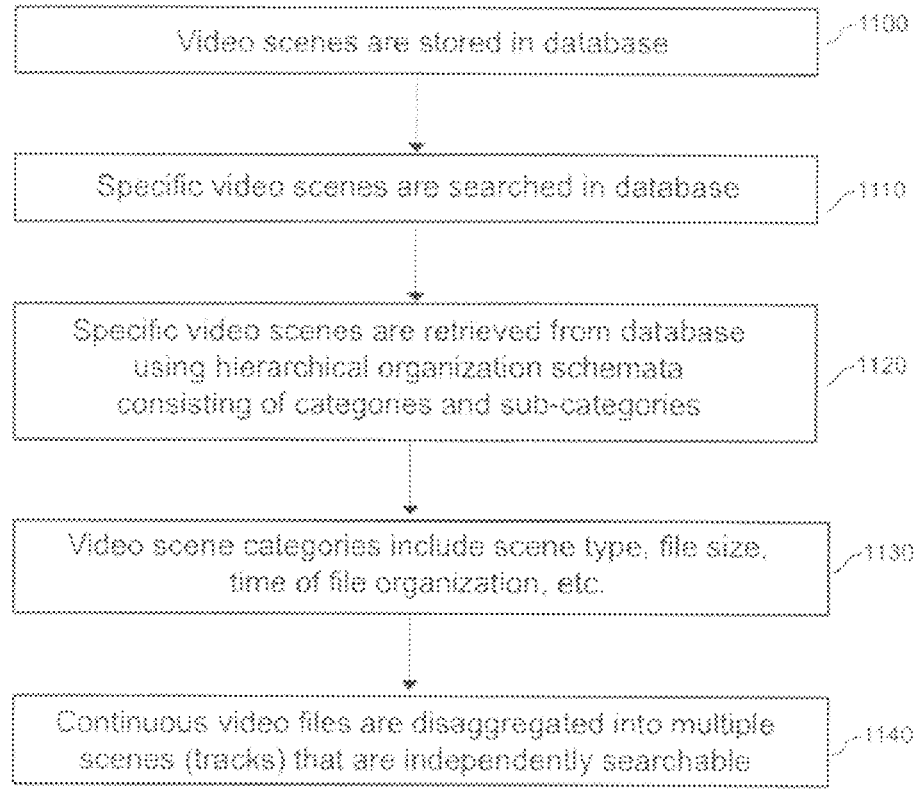
FIG. 11 is a flow chart showing the process of disaggregating video files in a video camera.

FIG. 11 shows the process of disaggregating video files in a video camera. Once the video scenes are stored in a database (1100), the specific video scenes are searched in the database (1110). The specific video scenes are retrieved from the database using a hierarchical organization schemata consisting of categories and subcategories (1120) and the video scene categories include scene type, file size, time of tile origination, etc. (1130). The continuous video files are disaggregated into multiple scenes (i.e., tracks) that are independently searchable (1140).

Figure 12:
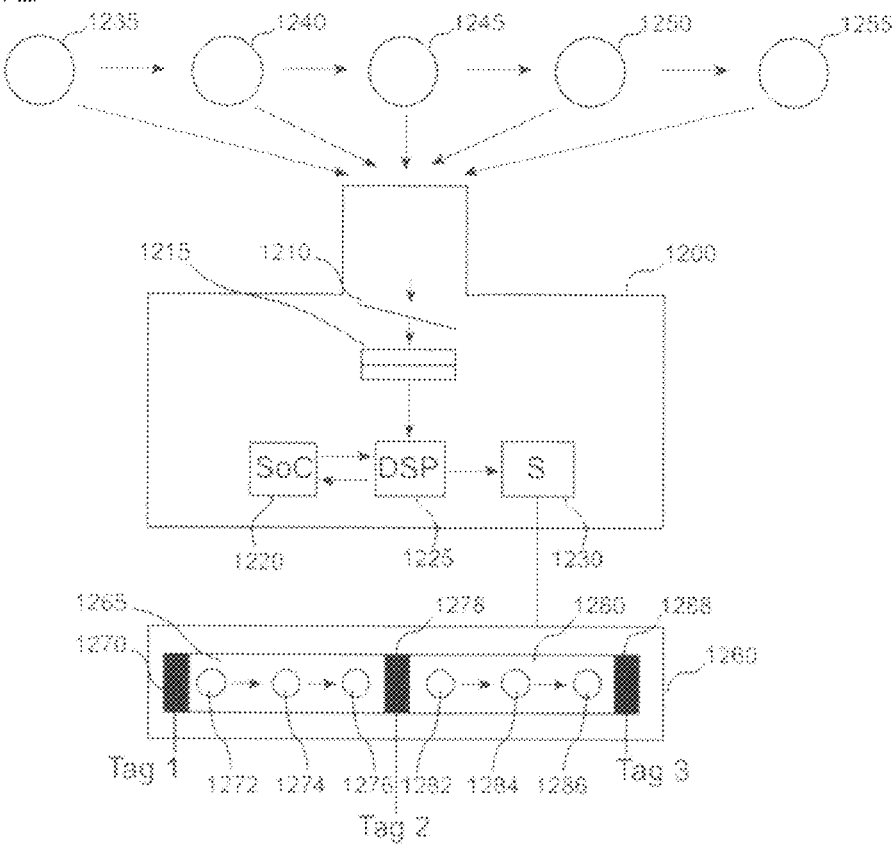
FIG. 12 is a schematic diagram showing the scenes separated by tags in a video image file.

FIG. 12 shows the scenes separated by tags in a video image file. An object (1235) moving from positions 1235 to 1255 is captured by a video camera (1200), shown with mirror (1210) and sensor (1215) apparatuses. The image files are sent to the DSP (1225), which accesses the SoC (1220), processes the image files and sends the files to storage (1230). The image files are shown below as a video set of image frames (1260). The frames are organized sequentially into separate scenes (1265 and 1280) consisting of combinations of separate frames (1272, 1274 and 1276 and 1282, 1284 and 1286). The separate scenes are shown separated by tags. Tag 1 (1270) and tag 2 (1278) are shown bounding scene 1 and tag 2 and tag 3 (1288) are shown bounding scene 2.

Figure 13:
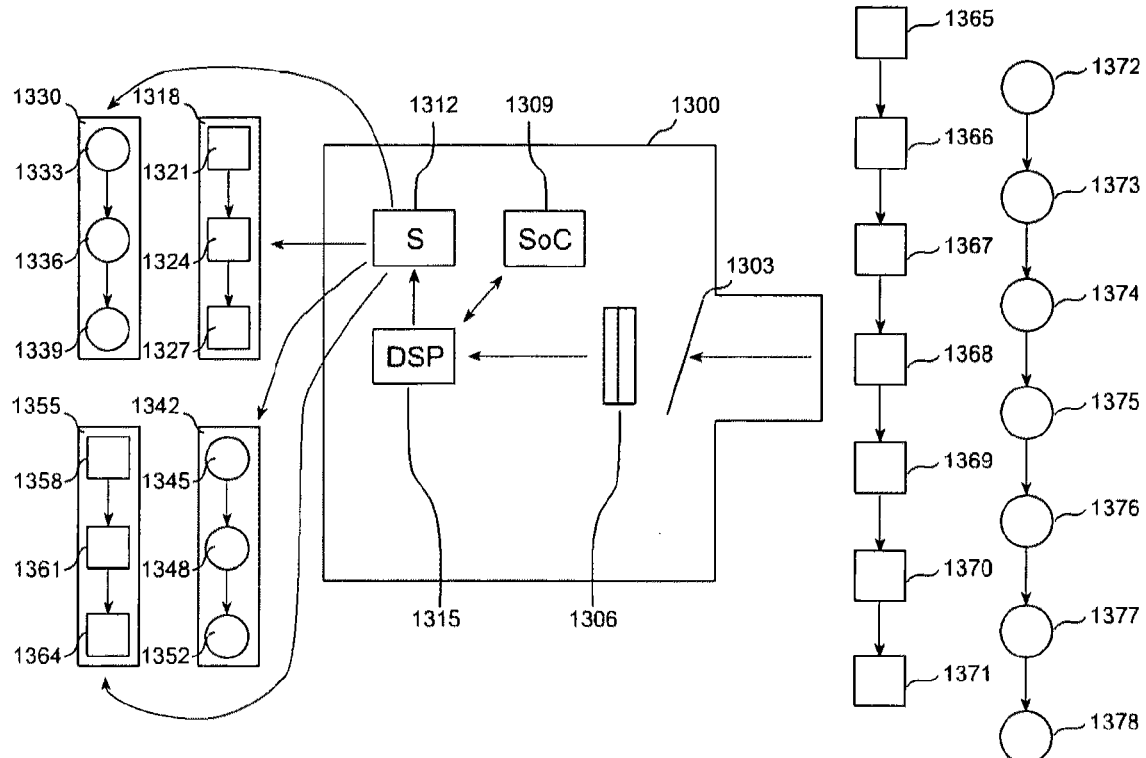
FIG. 13 is a schematic diagram showing different scenes organized and reaggregated in a video camera.

FIG. 13 shows different scenes organized and reaggregated in a video camera. The camera (1300) is shown with mirror (1303) and sensor (1306) apparatuses capturing objects (1365 and 1372) in motion from positions 1365 to 1371 and from 1372 to 1378, respectively. The image files are sent from the sensor to the DSP (1315), which accesses the SoC (1309), processes the image files and sends the processed image files to storage (1312). The image files are segregated by object and by scene. The object 1365 is shown in two disaggregated parts, the first part (1318) consisting of sequence 1321, 1324 and 1327) and the second part (1355) consisting of sequence 1358, 1361 and 1364. The object 1372 is shown in two disaggregated parts, the first part (1330) consisting of 1333, 1336 and 1339 and the second part (1342) consisting of 1345, 1348 and 1352.

Figure 14:
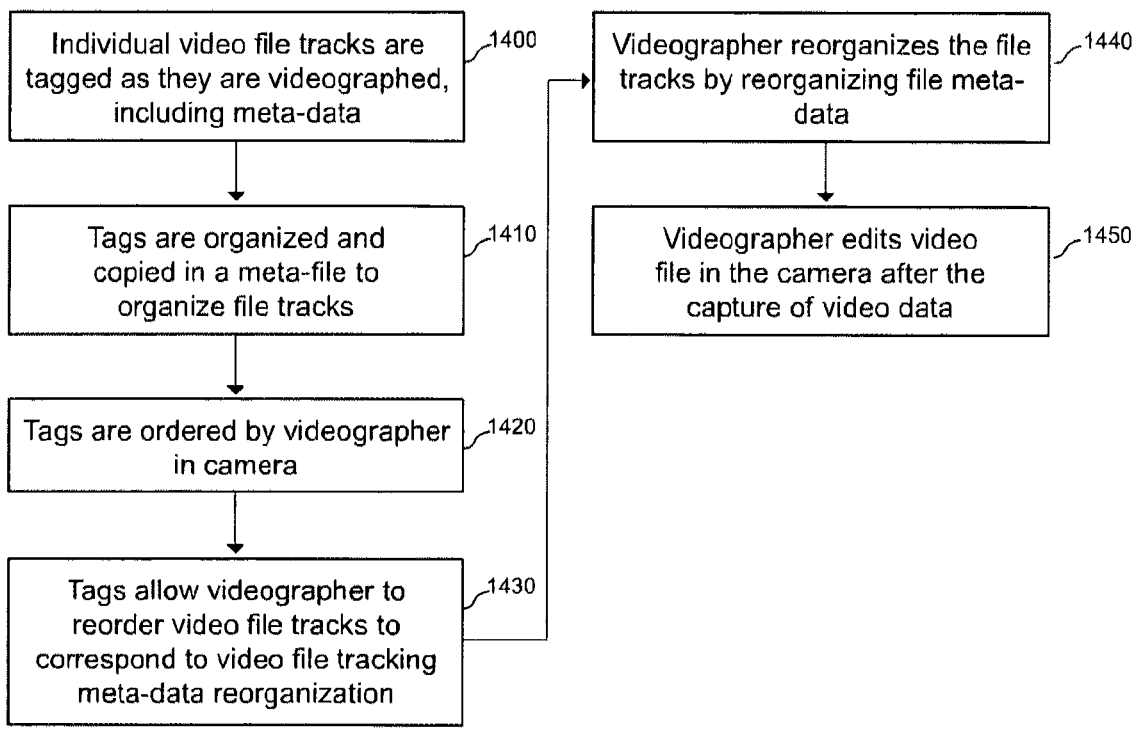
FIG. 14 is a flow chart showing the process of using image tags to reorder a video image file in a camera.

FIG. 14 shows the process of using image tags to reorder a video image file in a camera. After the individual video file tracks are tagged as they are videographed, including metadata (1400), the tags are organized and copied in a meta-file to organize file tracks (1410). The tags are ordered by the videographer in the camera (1420). The tags allow the videographer to reorder the video file tracks to correspond to the video file tracking meta-data reorganization (1430). The videographer reorganizes the file tracks by reorganizing file meta-data (1440) and the videographer edits the video file in the camera after the capture of video data (1450).

Figure 15:
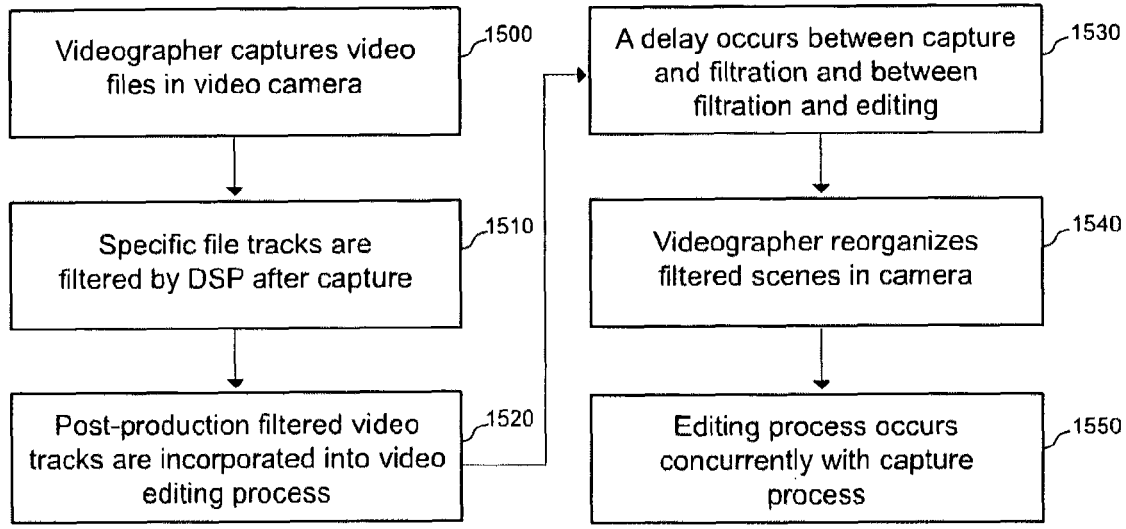
FIG. 15 is a flow chart showing the process of using a video camera to filter and reaggregate a video image file.

FIG. 15 shows the process of using a video camera to filter and reaggregate a video image file. Once the videographer captures video files in the video camera (1500), the specific file tracks are filtered by the DSP after the capture (1510). The post-production filtered video tracks are incorporated into the video editing process (1520). A delay occurs between the capture and filtration and between the filtration and the editing (1530). The videographer reorganizes the filtered scenes in the camera (1540) and the editing process occurs concurrently with the capture process (1550).

Figure 16:
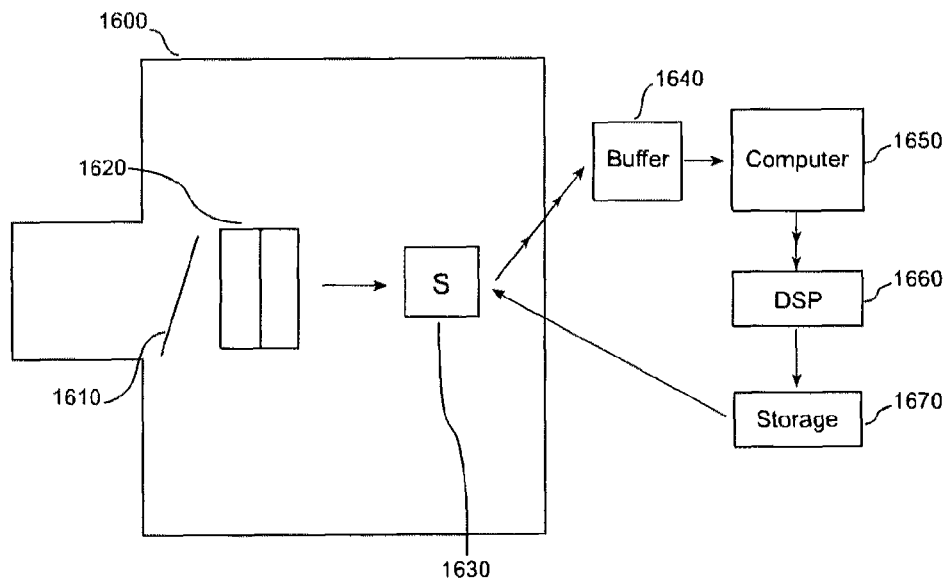
FIG. 16 is a schematic diagram showing the process of using a video camera to record unfiltered images and exporting the image files to an external computer for filtration.

FIG. 16 shows the process of using a video camera to record unfiltered images and exporting the image files to an external computer for filtration. The camera (1600) is shown with mirror (1610) and sensor (1620) mechanisms. The image files are captured and sent to storage (1630). The image files are then sent to an external computer (1650) through a memory buffer (1640). The computer forwards the files to the DSP (1660), which processes and then stores the files in storage (1670). The files are then forwarded back to the camera storage.

Figure 17:
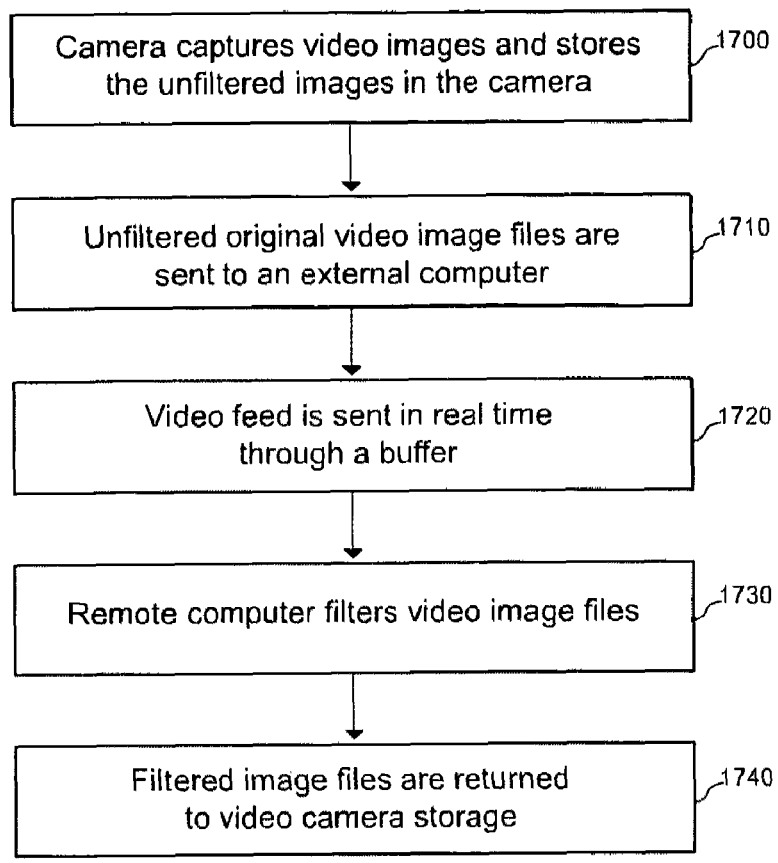
FIG. 17 is a flow chart showing the process of using an external computer to filter image files from a video camera.

FIG. 17 shows the process of using an external computer to filter image files from a video camera. After the camera captures video images and stores the unfiltered images in the camera (1700), the unfiltered original video image files are sent to an external computer (1710). The video feed is sent in real time through a buffer (1720) and the remote computer filters video image files (1730). The filtered image files are returned to video camera storage (1740).

Figure 18:
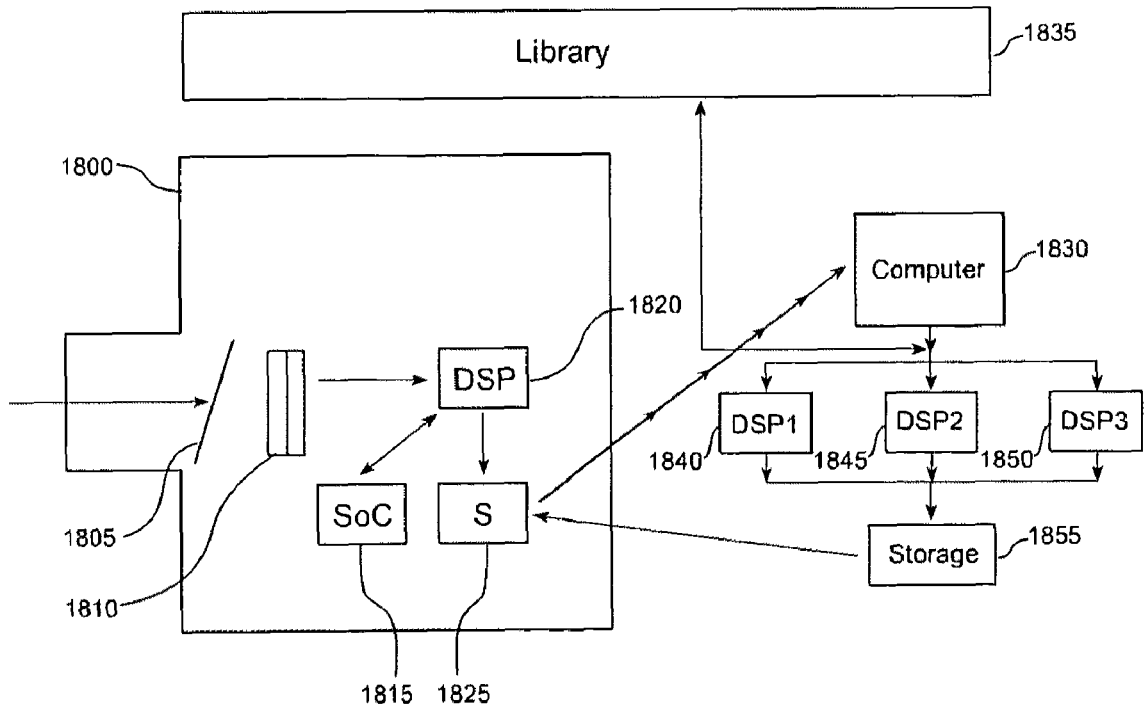
FIG. 18 is a schematic diagram showing the process of using a video camera to filter files and send a succession of files to an external computer, which filters the image files and returns the image files to the camera.

FIG. 18 shows the process of using a video camera to filter files and send a succession of files to an external computer, which filters the image files and returns the image files to the camera. The camera (1800), shown with mirror (1805) and sensor (1810) apparatuses, captures image files with the sensor and sends the files to the DSP (1820), which accesses the SoC (1815), processes the image files and stores the processed image files in storage (1825). Multiple image files are sequentially sent to an external computer (1830), which processes the image files sequentially in multiple DSPs, DSP 1 (1840), DSP 2 (1845) and DSP 3 (1850). The three DSPs then forward the processed image files to storage (1855) and the files are sent back to the camera storage (1825).

Figure 19:
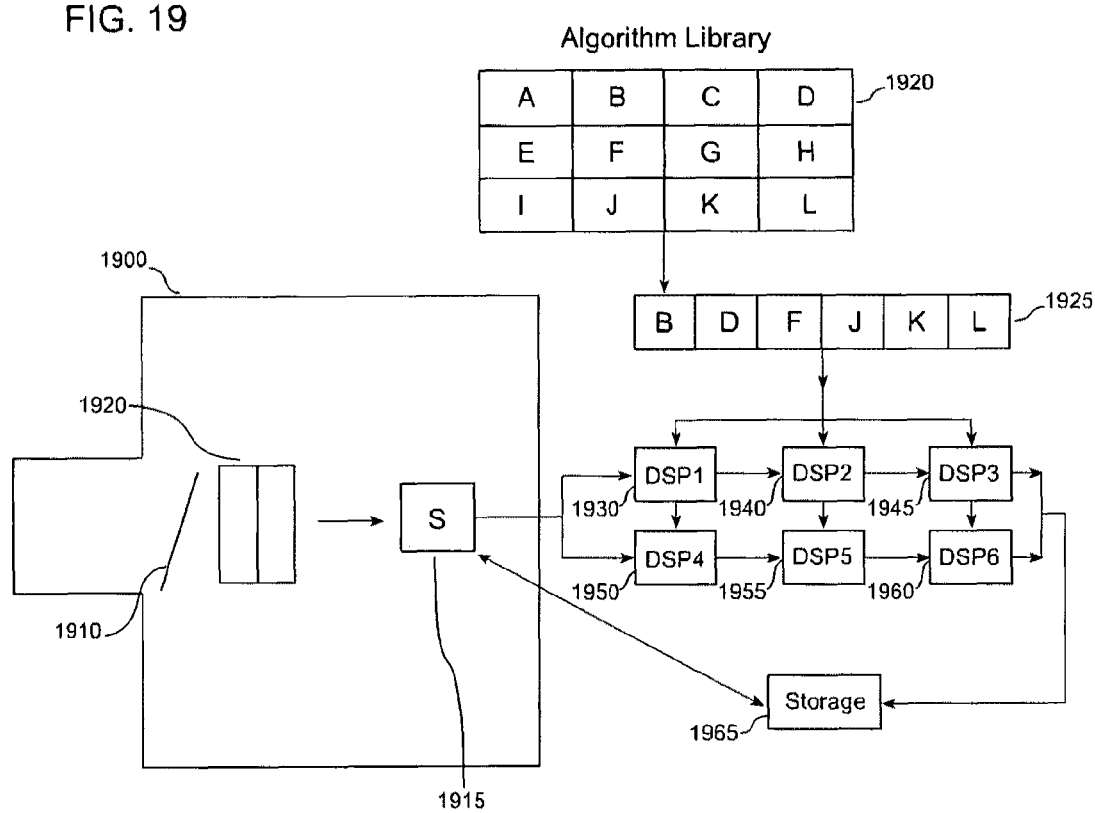
FIG. 19 is a schematic diagram showing the process of using algorithms from a library to apply to image files from a video camera in six DSPs in external computers.

FIG. 19 shows the process of using algorithms from a library to apply to image files from a video camera in six DSPs in external computers. The camera (1900), shown with mirror (1905) and sensor (1910) apparatuses, captures image files and sends them to storage (1915). The files are then forwarded to six external DSPs, DSP 1 (1930), DSP 2 (1940), DSP 3 (1945), DSP 4 (1950), DSP 5 (1955) and DSP 6 (1960). The DSPs access an algorithm library (1920), consisting of algorithms A to L. Specific algorithms are selected to process the image files, including the set B, D, F, J, K and L (1925). Once processed, the image files are forwarded to storage (1965) and the image files sent to the camera storage.

Figure 20:
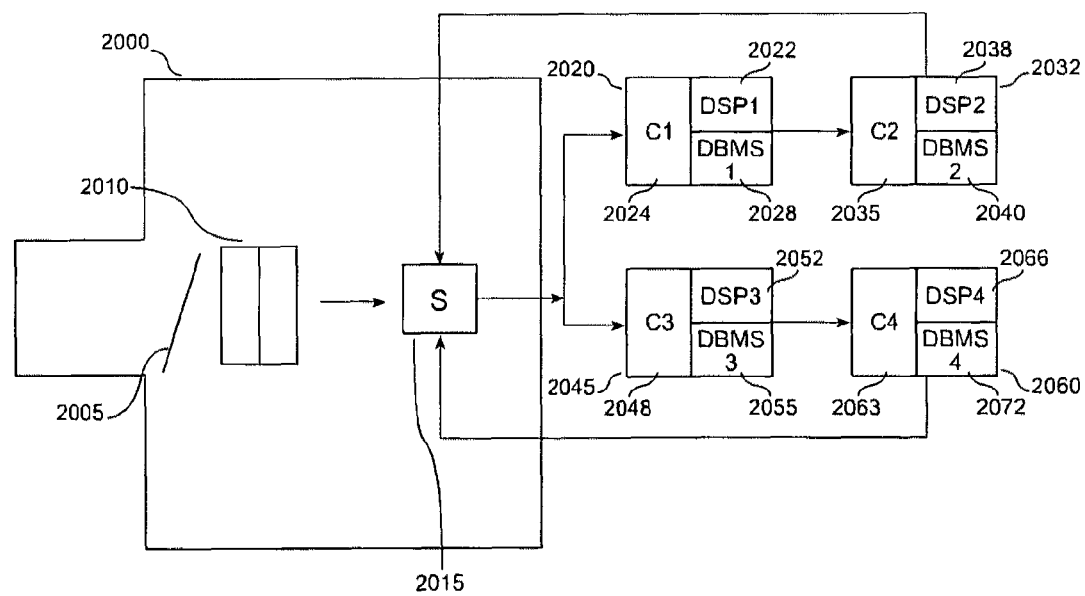
FIG. 20 is a schematic diagram showing the process of using four external computers in a network to filter video files from a video camera and return the filtered files to the camera.

FIG. 20 shows the process of using four external computers in a network to filter video files from a video camera and return the filtered files to the camera. The camera (2000) is shown with mirror (2005) and sensor (2010) apparatuses. After the camera sensor captures the image files, they are sent to storage (2015). The image files are then sent to four external computers in an external computer network. Computer one (2020) uses DSP 1 (2022) and database 1 (2028). Computer two (2032) uses DSP 2 (2038) and database 2 (2040). Computer three (2045) uses DSP 3 (2052) and database 3 (2055). Computer four (2060) uses DSP 4 (2066) and database 4 (2072). These DSPs and databases process the image files in a sequence. First, the camera sends the files to computers one and three. The image files are processed by these computers and then forwarded to computers two and four. Once the image files are processed, they are returned to camera storage.

I claim:
1. A digital video imaging system comprising:
   a digital video camera mechanism, an optical lens mechanism, at least one digital sensor, a CPU, system software, a database management system, at least one digital signal processor (DSP) and a memory storage sub-system;
   a camera communications circuit configured to transmit and receive signals;
   at least one external computer that includes at least one logic circuit, at least one a digital signal processor and memory storage;
   at least one algorithm used to process the digital video file;
   wherein the digital video file is captured by the digital video camera system using the optical lens mechanism and the at least one digital sensor;
   wherein the digital video file is forwarded from the at least one digital sensor to storage using the CPU and system software;
   wherein the aberrations from the optical lens mechanism and digital sensor mechanism are identified by the CPU by comparing the image frames in the digital video file to the database;
   wherein the CPU identifies solutions to the optical and/or digital aberrations in the video frames;
   wherein the camera CPU uses the communications circuit to send a request to at least one external computer for at least one algorithm to filter the image frames in the digital video file;
   wherein the at least one external computer sends at least one algorithm to the camera which is received by the camera's communications circuit;
   wherein the CPU forwards the at least one algorithm to the at least one DSP to apply the at least one algorithm to correct the optical and/or digital aberrations in the image frames and filter the video file; and wherein the filtered video file is forwarded to the memory storage sub-system.

2. The system of claim 1:
wherein the CPU sends the digital video file to the communications circuit;
wherein the communications circuit transmits the digital video file to the at least one external computer;
wherein the at least one external computer uses at least one logic circuit and at least one DSP to apply at least one algorithm to filter the optical and/or digital aberrations in the image frames of the digital video file; and
wherein the filtered digital video file is sent to memory storage.

3. The system of claim 2:
wherein the filtered digital video file is sent to the camera communications circuit and forwarded to the memory storage sub-system.

4. The system of claim 2:
wherein the filtered digital video file is sent to a remote device for storage and display.

5. The system of claim 2:
wherein the at least one external computer uses at least one DSP to apply filtration algorithms to adjust exposure, highlight and shadow in image frames of the digital video file.

6. The system of claim 2:
wherein the at least one external computer uses at least one DSP to apply special effects filtration to at least one image frame of the digital video file.

7. A system of claim 1:
wherein the optical aberrations include vignetting, pin cushioning and chromatic aberrations of the images in the digital video file.

8. The system of claim 1:
wherein the digital aberrations involve aliasing or moiré of the images in the digital video file.

9. The system of claim 1:
wherein algorithms used to filter the images in the video file are downloaded to the digital camera from at least one computer in a computer network.

10. The system of claim 1:
wherein the lens mechanism in the digital video camera used to capture the video file is a single focal length lens.

11. The system of claim 1:
wherein the lens mechanism in the digital video camera used to capture the video file is a zoom lens.

12. The system of claim 11:
wherein the zoom lens autofocus mechanism focuses on objects and identifies the continuously changing distance information;
wherein the camera CPU calculates the optimal focal length to correspond to the changing positions of objects in order to obtain optimal framing selected by the user; and
wherein the zoom lens adjusts focal lengths automatically in order to maintain in the frame at least one moving object.

13. A digital video imaging system comprising:
a digital video camera mechanism, an optical lens mechanism, at least one digital sensor, a CPU, system software, a database management system, at least one digital signal processor (DSP) and a memory storage sub-system;
at least one external computer that includes at least one logic circuit, at least one DSP and memory storage;
a camera communications circuit configured to transmit and receive signals;
at least one algorithm used to process the digital video file;
wherein the digital video file is captured by the digital video camera using at least one digital sensor;
wherein the digital video file is forwarded from the optical lens mechanism and the at least one digital sensor to the camera memory storage using the CPU and system software;
wherein the user tags and prioritizes the digital video file tracks;
wherein the digital video camera uses the communications circuit to receive at least one algorithm from at least one external computer to edit the video file;
wherein the CPU accesses the database to identify the order of tracks in the digital video file;
wherein the digital video tracks are edited and reorganized according to the priority of the tags; and
wherein the reorganized digital video file is sent to memory storage.

14. The system of claim 13:
wherein the CPU sends the digital video file to a communications circuit;
wherein the communications circuit sends the digital video file to at least one external computer;
wherein the at least one external computer uses at least one logic circuit to apply at least one algorithm to edit the digital video file;
wherein the separate tracks are combined in a specific order in order to assemble the digital video file into a coherent file according the user specifications; and
wherein the reaggregated video file is sent to memory storage.

15. The system of claim 14:
wherein the edited digital video file is sent to the camera; and
wherein the digital video file is forwarded to the memory storage sub-system.

16. The system of claim 14:
wherein the at least one external computer uses at least one DSP to apply filtration algorithms to correct optical and/or digital aberrations in the video file; and
wherein the filtered video file is forwarded to the camera memory storage sub-system or a remote device for storage and viewing.

17. The system of claim 14:
wherein the at least one external computer uses at least one DSP to apply special effects filtration to the video files; and
wherein the modified video file is sent to memory storage.

18. A method of video image filtration which comprises:
a digital video camera mechanism, an optical lens mechanism, at least one digital sensor, a CPU, system software, a database management system and a memory storage sub-system;
a camera communications circuit configured to transmit and receive signals;
at least one external computer that includes at least one digital signal processor;
wherein the aberrations from the optical lens mechanism are corrected by applying digital filtration by using the CPU, the method consisting of:
processing the image data captured using the optical lens mechanism and at least one digital sensor by using the CPU and at least one DSP;
using the CPU to access the database to assess specific optical and digital aberrations of image frames in the digital video file;
sending the digital video file to a communications circuit;

sending the digital video file to at least one external computer;
using at least one external computer to identify solutions to the optical and digital aberrations in the at least one image frame of the digital video file;
using at least one DSP in at least one external computer to apply at least one algorithm to modify the optical and/or digital aberrations in the at least one image frame of the of the digital video file;
forwarding the modified digital video file to the camera communications circuit and to the camera storage subsystem; and
using the camera display to view the modified digital video file.

19. The method system of claim 18, further comprising:
applying the filtration to optical aberrations including vignetting, pin cushioning and chromatic aberrations of the images in the digital video file.

20. The method of claim 18, further comprising:
applying the filtration to digital aberrations involving aliasing or moiré of the images in the digital video file.

* * * * *